United States Patent
Trinkle et al.

(10) Patent No.: US 11,835,540 B2
(45) Date of Patent: Dec. 5, 2023

(54) METHOD OF OPERATING A FACILITY, FACILITY AND SYSTEM

(71) Applicant: Andreas Stihl AG & Co. KG, Waiblingen (DE)

(72) Inventors: Simon Trinkle, Kaisersbach (DE); Tim Vogt, Schwaebisch Gmuend (DE); Mario Buser, Kufstein (AT)

(73) Assignee: Andreas Stihl AG & Co. KG, Waiblingen (DE)

( * ) Notice: Subject to any disclaimer, the term of this patent is extended or adjusted under 35 U.S.C. 154(b) by 0 days.

(21) Appl. No.: 17/454,652

(22) Filed: Nov. 12, 2021

(65) Prior Publication Data
US 2022/0155333 A1 May 19, 2022

(30) Foreign Application Priority Data
Nov. 13, 2020 (EP) .................................... 20207419

(51) Int. Cl.
*G01P 15/08* (2006.01)
*G01P 1/07* (2006.01)
*G06Q 10/0631* (2023.01)

(52) U.S. Cl.
CPC ............... *G01P 15/08* (2013.01); *G01P 1/07* (2013.01); *G06Q 10/0631* (2013.01)

(58) Field of Classification Search
None
See application file for complete search history.

(56) References Cited

U.S. PATENT DOCUMENTS

| 2009/0035609 A1* | 2/2009 | Ludtke | H01M 10/4257 |
| | | | 429/10 |
| 2010/0045429 A1* | 2/2010 | Mullet | G07C 9/00182 |
| | | | 340/5.71 |

(Continued)

FOREIGN PATENT DOCUMENTS

| DE | 10 2016 201 497 A1 | 8/2017 |
| EP | 2 438 746 B1 | 10/2018 |

(Continued)

OTHER PUBLICATIONS

German-language European Search Report issued in European Application No. 20207419.1 dated Apr. 30, 2021 with partial English translation (nine (9) pages).

*Primary Examiner* — Natalie Huls
*Assistant Examiner* — Cynthia L Davis
(74) *Attorney, Agent, or Firm* — Crowell & Moring LLP

(57) ABSTRACT

A method includes a) operating an inertial sensor device arranged on or in a mobile motor-driven processing device in a motion-monitoring operating mode to monitor whether an inertial variable or a variable based on the inertial variable fulfills a motion criterion, wherein the motion criterion is characteristic of a motion of the processing device, b) if the motion criterion is fulfilled, operating the inertial sensor device in a shock and/or impact-monitoring operating mode to monitor whether the inertial variable or a variable based on the inertial variable fulfills a shock and/or impact criterion, wherein the shock and/or impact criterion is characteristic of an atypical motion of the processing device, and c) if the shock and/or impact criterion is fulfilled, transmitting an information signal via the inertial sensor device and operating the control device as a function of the transmitted information signal.

18 Claims, 4 Drawing Sheets

(56) References Cited

U.S. PATENT DOCUMENTS

2014/0191846 A1* 7/2014 Zhao .................. G06K 19/0723
　　　　　　　　　　　　　　　　　　　340/10.1
2017/0053461 A1　　2/2017　Pal et al.
2017/0188946 A1* 7/2017 Klusmann ............... A61M 1/90
2017/0312572 A1* 11/2017 Thornton ........... A63B 69/3632
2019/0027002 A1　　1/2019　Esenwein et al.

FOREIGN PATENT DOCUMENTS

| EP | 3 588 229 A2 | 1/2020 |
| EP | 3 588 373 A1 | 1/2020 |
| SE | 539 516 C2 | 10/2017 |

* cited by examiner

METHOD OF OPERATING A FACILITY, FACILITY AND SYSTEM

CROSS REFERENCE TO RELATED APPLICATION

This application claims priority under 35 U.S.C. § 119 from European Patent Application No. 20207419.1, filed Nov. 13, 2020, the entire disclosure of which is herein expressly incorporated by reference.

BACKGROUND AND SUMMARY OF THE INVENTION

The invention relates to a method for operation of a device, wherein the device is arranged on or in a mobile motor-driven processing device, a device, wherein the device is formed, particularly arranged, on or in a mobile motor-driven processing device, and a system having such a device and the processing device.

The object of the invention is the provision of a method for operation of a device, wherein the device is arranged on or in a mobile motor-driven processing device, a device, wherein the device is formed, particularly arranged, on or in a mobile motor-driven processing device, and a system having such a device and the processing device, wherein the method and the device and thus the system each have improved properties.

The invention achieves this object by providing a method, a device, and a system in accordance with the independent claims. Advantageous refinements and/or embodiments of the invention are described in the dependent claims.

The method according to the invention, which is particularly automatic, is formed or configured or provided for operation, particularly automatic, of a device, which is particularly electrical. The device is arranged, particularly fastened, on, particularly in, a mobile or portable motor-driven processing device, particularly a part of the processing device. The device comprises or has a, particularly electrical, inertial sensor device and a, particularly electrical, control device (controller). The inertial sensor device comprises or has at least one, particularly electrical, inertial sensor. The inertial sensor is formed or configured, particularly automatically, to detect an inertial variable, particularly a value of the inertial variable.

The method comprises or has the following steps: a) operation, particularly automatic operation, of the inertial sensor device in a motion-monitoring operating mode for monitoring, particularly only by means of the inertial sensor device in the motion-monitoring operating mode, whether the, particularly detected, inertial variable or a variable based on the inertial variable, particularly a value of the variable, fulfills, particularly or not, a motion criterion, particularly a predetermined motion criterion, particularly a value of the motion criterion. The motion criterion is characteristic of a motion, particularly a value of the motion and/or a strange motion, of the processing device; b) if, particularly at least, the motion criterion is fulfilled or triggered by the fulfillment of the motion criterion, operation, particularly automatic operation, of the inertial sensor device in a shock and/or impact-monitoring operating mode for monitoring, particularly only by means of the inertial sensor device in the shock and/or impact-monitoring operating mode, whether the, particularly detected, inertial variable or a variable based on the inertial variable, particularly a value of the variable, fulfills, particularly or not, a shock and/or impact criterion, particularly a predetermined shock and/or impact criterion, particularly a value of the shock and/or impact criterion. The shock and/or impact criterion is characteristic of an atypical motion, particularly a value of the shock and/or impact, of the processing device; c) if, particularly at least, the shock and/or impact criterion is fulfilled or triggered by the fulfillment of the shock and/or impact criterion, transmission, particularly automatic transmission and/or creation or generation of an information signal by means of the inertial sensor device and operation, particularly automatic operation, of the control device as a function of the transmitted information signal. The detection of the shock and/or impact criterion may be used to detect the potential for abuse in the handling, storage or shipping of a device, or for providing information to fleet managers to assist in providing training to personnel handling the device during shipping and handling periods.

The arrangement of the device on or in the processing device enables a motion, particularly the motion of the processing device, to cause the device to move. This thus enables monitoring by means of the inertial sensor device.

Additionally or alternatively, operation of the inertial sensor device in, particularly either, the motion-monitoring operating mode or the shock and/or impact-monitoring operating mode enables an optimal, particularly energy-consumption-optimized, operation of the inertial sensor device, particularly the device for detecting or recognizing the atypical motion.

This is because typically a, particularly the, atypical motion of the processing device, can precede a, particularly the, motion of the processing device, in time. For example, the processing device can be raised before the raised processing device can be thrown and hit, particularly impacted, for example during loading of a vehicle, particularly onto a loading area of the vehicle.

The operation of the inertial sensor device in the motion-monitoring operating mode can be sufficient for detecting or recognizing the, particularly initial, motion. However, the operation of the inertial sensor device in the motion-monitoring operating mode may or may not be sufficient for detecting or recognizing the atypical motion, which is particularly later in time. This may or may not be necessary. This is because the operation of the inertial sensor device in the shock and/or impact-monitoring operating mode may be sufficient for detecting or recognizing the atypical motion, which is particularly later in time.

In this case, the operation of the inertial sensor device in the motion-monitoring operating mode may be more energy-efficient than the operation of the inertial sensor device in the shock and/or impact-monitoring operating mode.

Thus, operation of the inertial sensor device in the motion-monitoring operating mode can enable energy-efficient operation of the inertial sensor device, particularly the device, and the switch or transition from operating the inertial sensor device in the motion-monitoring operating mode to operating the inertial sensor device in the shock and/or impact-monitoring operating mode can enable the detection or recognition of the atypical motion.

In particular, the inertial sensor device can switch or transition from operation in the motion-monitoring operating mode to operation in the shock and/or impact-monitoring operating mode by itself or alone, particularly without the control device.

Additionally or alternatively, the inertial sensor device can be operated in, particularly either, the motion-monitoring operating mode or the shock and/or impact-monitoring operating mode, particularly at a point in time. In other words: the inertial sensor device can only, particularly either, monitor whether the motion criterion is fulfilled, particularly or not, or monitor whether the shock and/or impact criterion is fulfilled, particularly or not, particularly at a point in time.

Furthermore, additionally or alternatively, the method ensures that the control device does not or may not need to monitor the inertial variable or the variable, particularly continually over time.

In particular, the inertial sensor device and the control device can be different. Additionally or alternatively, the motion-monitoring operating mode and the shock and/or impact-monitoring operating mode may be different. Furthermore, additionally or alternatively, the motion criterion and the shock and/or impact criterion may be different.

In particular, the information signal may be a shock and/or impact signal. In particular, the shock and/or impact criterion may be characteristic of an atypical momentum, particularly a value of the momentum, on the processing device.

As long as the motion criterion is not fulfilled, the inertial sensor device can be operated in the motion-monitoring operating mode. Additionally or alternatively, if the motion criterion is not fulfilled, the inertial sensor device does not need to or cannot be operated in the shock and/or impact-monitoring operating mode. Furthermore, additionally or alternatively, as long as the motion criterion is fulfilled, the inertial sensor device can be operated in the shock and/or impact-monitoring operating mode. Furthermore, additionally or alternatively, if the shock and/or impact criterion is not fulfilled, an information signal, particularly the information signal, is not transmitted by means of the inertial sensor device, and the control device does not need to or cannot be operated as a function of the transmitted information signal.

Step b) can be carried out after step a). Additionally or alternatively, step c) can be carried out after step a) and/or step b). Furthermore, additionally or alternatively, step a) or step b) can be carried out, particularly again, after step c).

The device can be different from the processing device, particularly formed distinctly or separately. This can enable the device to be retrofitted on the processing device. Additionally or alternatively, the device can be formed for, particularly detachable, connection to the processing device, particularly by means of a material connection, such as an adhesive bond, a force-fit connection, such as a latching or snap connection, and/or a form-fit connection, such as a screw connection.

The processing device can be guided on the ground and/or be hand-held, particularly hand-carried. A particularly hand-held, particularly hand-carried, processing device can mean that the processing device has or can have a mass of no more than 50 kilograms (kg), particularly no more than 20 kg, particularly no more than 10 kg. Additionally or alternatively, the processing device can be a garden, forest, construction, and/or soil cultivation device. In particular, the processing device can be a saw, particularly a chainsaw, or a pruner, or a hedge trimmer, or a hedge cutter, or a wood cutter, or pruning shears, or a blower, or a leaf blower, or a suction device, or a leaf vacuum, or a cleaning device, or a high-pressure cleaner, or a roller brush, or a sweeping brush, or a lawn mower, particularly a robotic lawn mower, or a brush cutter, or a scarifier. Furthermore, additionally or alternatively, the processing device can have an electric drive motor and/or a combustion drive motor.

In one refinement of the invention, the inertial sensor is an acceleration and/or rotation rate sensor. The inertial variable is an acceleration and/or a rate of rotation. In particular, the inertial sensor can either be just an acceleration sensor or an acceleration and rotation rate sensor and/or the inertial variable can either just be an acceleration or an acceleration and a rate of rotation. Additionally or alternatively, the acceleration sensor can be referred to as a g-sensor.

In one refinement of the invention, the motion criterion is that the inertial variable or the variable is equal to or greater than or higher than a, particularly predetermined, motion limit value. The shock and/or impact criterion is that the inertial variable or the variable is equal to or greater than or higher than a, particularly predetermined, shock and/or impact limit value. The shock and/or impact limit value is greater or higher, particularly a minimum of two times, particularly a minimum of five times, particularly a minimum of ten times, greater than the motion limit value. This enables differentiation of a, particularly the, shock and/or impact from a, particularly further, motion.

In one refinement of the invention, the motion criterion is that the inertial variable or the variable is equal to or greater than or higher than a, particularly predetermined and/or the, motion limit value. The motion limit value is characteristic of an, particularly the, acceleration of a minimum of 0.005 g (acceleration due to gravity and/or 1 g=9.81 m/s$^2$ (meters per second squared)) and/or a maximum of 0.5 g, particularly 0.015 g. Additionally or alternatively, the shock and/or impact criterion is that the inertial variable or the variable is equal to or greater than or higher than a, particularly predetermined and/or the, shock and/or impact limit value, particularly a shock limit value. The shock and/or impact limit value is characteristic of an acceleration greater than 0.5 g, particularly no less than 2 g, and/or no more than 20 g, particularly 5 g. The motion limit value enables a motion, particularly a typical motion, to be detected or recognized. Additionally or alternatively, the shock and/or impact limit value enables the detection or recognition of a, particularly typical, high acceleration. In particular, the inertial variable or the variable may be without the natural acceleration due to gravity of 1 g or this can be compensated or taken into account, particularly subtracted.

In one refinement of the invention, in the motion-monitoring operating mode, the inertial variable is detected with a, particularly predetermined, motion sampling rate, particularly a value of the motion sampling rate or motion sampling frequency. In the shock and/or impact-monitoring operating mode, the inertial variable is detected with a, particularly predetermined, shock and/or impact sampling rate, particularly a value of the shock and/or impact sampling rate and/or a shock sampling rate, or a shock and/or impact sampling frequency. The shock and/or impact sampling rate is greater or higher, particularly two times greater, than the motion sampling rate. This enables differentiation of a, particularly the, atypical motion from a, particularly further, motion. In particular, the atypical motion can typically be shorter in time than the motion. Thus, this enables the energy-consumption-optimized detection or recognition of the motion and the atypical motion. In particular, the motion-monitoring operating mode can be referred to as a low-power mode. Additionally or alternatively, the shock and/or impact-monitoring operating mode can be referred to as a normal power mode.

In one refinement of the invention, in the motion-monitoring operating mode, the inertial variable is detected with a, particularly predetermined, motion sampling rate, particularly with a value of the motion sampling rate or motion sampling frequency. The motion sampling rate is a minimum of 1 Hz (Hertz) and/or maximum of 50 Hz, particularly 25 Hz. Additionally or alternatively, in the shock and/or impact-monitoring operating mode, the inertial variable is detected with a, particularly predetermined and/or the, shock and/or impact sampling rate, particularly a value of the shock and/or impact sampling rate and/or a shock and/or impact sampling frequency. The shock and/or impact sampling rate is greater or higher than 50 Hz and/or a maximum of 1000 Hz, particularly 100 Hz. The motion sampling rate enables a motion, particularly a typical motion, to be detected or recognized. Additionally or alternatively, the shock and/or impact sampling rate enables the detection or recognition of a, particularly typical, high acceleration. Thus, this enables the energy-consumption-optimized detection or recognition of the motion and the atypical motion. In particular, the motion-monitoring operating mode can be referred to as a low-power mode. Additionally or alternatively, the shock and/or impact-monitoring operating mode can be referred to as a normal power mode.

In one refinement of the invention, the method comprises or has the following: if at least the shock and/or impact criterion, particularly a stay criterion, particularly a value of the stay criterion, is not fulfilled, particularly by the inertial variable or a variable based on the inertial variable, and a, particularly predetermined, time duration, particularly a value of the time duration, has expired or been reached since fulfillment of the motion criterion and/or a start or begin of the operation in the shock and/or impact-monitoring operating mode, operation, particularly automatic operation, of the inertial sensor device in the motion-monitoring operating mode, particularly again. This enables a switch or a transition from operation of the inertial sensor device in the shock and/or impact-monitoring operating mode to operation of the inertial sensor device in the motion-monitoring operating mode, particularly if the motion is not followed chronologically by a high acceleration. In particular, the inertial sensor device can switch or transition from operation in the motion-monitoring operating mode to operation in the shock and/or impact-monitoring operating mode by itself or alone, particularly without the control device. Additionally or alternatively, the stay criterion can be different from the motion criterion and/or the shock and/or impact criterion. Furthermore, additionally or alternatively, the stay criterion may be that the inertial variable or the variable is equal to or greater than or higher than a, particularly predetermined, stay limit value. In particular, the stay limit value can be greater or higher, particularly at least two times greater, than the motion limit value and/or less or lower than the shock and/or impact limit value. Additionally or alternatively, the stay limit value can be characteristic of a, particularly the, acceleration of 0.04 g. Furthermore, additionally or alternatively, the time duration can be a minimum of 1 second(s), particularly a minimum of 2 s, particularly a minimum of 5 s, and/or a maximum of 120 s, particularly a maximum of 60 s, particularly a maximum of 30 s, particularly 10 s. Furthermore, additionally or alternatively, as long as the stay criterion, to the extent provided, or even the shock and/or impact criterion is fulfilled and/or the time duration has not expired, the inertial sensor device can be operated in the shock and/or impact-monitoring operating mode.

In one refinement of the invention, step c) comprises or has: transmission, particularly automatic transmission, of the information signal, particularly in the form of an interrupt or disconnect signal, from the inertial sensor device to the control device. This enables the control device to be operated as a function of the transmitted information signal and/or that the control device, particularly periodically or cyclically, does not query the inertial sensor device or does not need or cannot perform polling. Thus, this enables the control device, particularly the device, to be operated with low energy consumption.

In one refinement of the invention, the device comprises or has a, particularly electrical, storage device and/or a, particularly electrical, output and/or transmission device. Step c), particularly operation of the control device, comprises or has: transmission, particularly automatic transmission, of the information signal, particularly a value of the information, particularly based on the information signal and/or the inertial variable or the variable and/or created or generated by means of the control device, by means of the control device to the storage device for, particularly automatic, storage and/or, particularly from the storage device to the output and/or transmission device for, particularly automatic, output and/or, particularly automatic and/or wireless, transmission to a, particularly electrical, external device of the information signal or of the information or information based on the information signal, particularly a value of the information, particularly as a function of the transmitted information signal. This enables the atypical motion event to be perceived, particularly by an owner and/or a next user of the processing device. This therefore enables the processing device to be examined, particularly by the owner and/or the next user as to whether there is any information available, particularly or not, about the processing device, particularly caused by the atypical motion. In particular, the storage device can be different from the inertial sensor device and/or the control device and/or the output and/or transmission device and/or the device. Additionally or alternatively, the storage device can be non-volatile. Furthermore, additionally or alternatively, the output and/or transmission device can be different from the inertial sensor device and/or the control device and/or the storage device and/or the device. Furthermore, additionally or alternatively, the output can be optic or acoustic and/or haptic. Furthermore, additionally or alternatively, the transmission can be via Bluetooth. Furthermore, additionally or alternatively, the device can be different from the device and/or the processing device, particularly formed distinctly or separately. Furthermore, additionally or alternatively, the device can be mobile or portable, particularly hand-carried, and/or be a smartphone.

In one refinement of the invention, the control device is mostly or at least a large part of the time, particularly all the time, in an energy-saving state, particularly an inactive state or sleep state, during step a) and/or step b). Step c) comprises or has: transition, particularly automatic transition, or switching of the control device from the energy-saving state to an active state or awake state as a function of the transmitted information signal. This enables the control device, particularly the device, to be operated with low energy consumption. In particular, the energy-saving state and the active state can be different. In particular, the energy-saving state can be less energy-consuming than the active state. Additionally or alternatively, all the time can mean more than 50% (percent), particularly at least 60%, particularly at least 70%, particularly at least 80%, particularly at least 90%, particularly at least 95%, particularly at least 99% of the time. Furthermore, additionally or alternatively, the transition from the energy-saving state to the active state can be referred to as waking up. Furthermore, additionally or alternatively, the control device can be transitioned or switched from the active state to the energy-saving state, particularly again, after step c).

In one refinement of the invention, the device comprises or has, particularly only, one, particularly single, electrical energy storage device, particularly a battery. In particular, electrical energy for operating the inertial sensor device and the control device is only drawn from the energy storage device, particularly automatically, particularly if or as long as the device, particularly the inertial sensor device and the control device, cannot, particularly, draw energy from the processing device. This enables the atypical motion to be detected or recognized independently of an operational state of the processing device, particularly an ON state of a drive motor of the processing device. In particular, energy cannot be drawn from the processing device at least when a drive motor of the processing device is in an OFF state, particularly when the processing device is in an inoperative state. In particular, the inoperable state may be caused by the absence of a propulsion energy source, particularly a disconnection from a traction battery. Additionally or alternatively, the method makes it possible to save energy in the energy storage device and thus to extend the service life of the energy storage device. In particular, the energy storage device can be rechargeable.

In one embodiment of the invention, the energy storage device comprises or has a maximum energy content of at least 10 mWh (milliwatt hours) and/or a maximum of 20 Wh (watt hours), particularly 2 Wh. Additionally or alternatively, the energy storage device is, particularly, only one, particularly single, cell, particularly a button cell. Thus, the energy storage device has a small or low energy content. In particular, the button cell can be a CR 2032 button cell or a CR 2450 button cell. Additionally or alternatively, the cell can be a round cell. In particular a 14500 round cell, and/or be a pouch cell. Furthermore, additionally or alternatively, the cell can also be a Li-ion cell. Furthermore, additionally or alternatively, the cell can be a secondary cell and/or rechargeable.

In one refinement of the invention, the at least one inertial sensor is formed or configured for, particularly automatically, detecting at least one inertial variable in a plurality of, particularly different, particularly mutually orthogonal directions. The method comprises or has, particularly, the following step: determination, particularly automatic determination, of shock and/or impact direction information, particularly a value of shock and/or impact direction information and/or of shock direction information based on the at least one, particularly detected, inertial variable in the directions. This enables a targeted examination of the processing device. In particular, the shock direction information can include, particularly be, a location and/or a component of the processing device.

The device according to the invention is formed or configured, particularly arranged, particularly fastened, for arrangement, particularly fastening, on, particularly in, a, particularly the, mobile motor-driven processing device. The device has a, particularly the, inertial sensor device and a, particularly the, control device. The inertial sensor device has at least one, particularly the, inertial sensor. The inertial sensor is formed or configured to detect a, particularly the, inertial variable. The device is formed for: operation of the inertial sensor device in a, particularly the, motion-monitoring operating mode for monitoring whether the inertial variable or a, particularly the, variable based on the inertial variable fulfills a, particularly the, motion criterion. The motion criterion is characteristic of a, particularly the, motion of the processing device. If the motion criterion is fulfilled for operation of the inertial sensor device in a, particularly the, shock and/or impact-monitoring operating mode for monitoring whether the inertial variable or a, particularly the, variable based on the inertial variable, fulfills a, particularly the, shock and/or impact criterion. The shock and/or impact criterion is characteristic of a, particularly the, atypical motion of the processing device. If the shock and/or impact criterion is fulfilled for transmission of a, particularly the, information signal by means of the inertial sensor device and for operation of the control device as a function of the transmitted information signal. The device can enable at least some or even all of the advantages mentioned above for the method. In particular, the device can be formed or configured for, particularly automatic, execution of a method, particularly the aforementioned method. Additionally or alternatively, the device, particularly the inertial sensor device and/or the control device, can be formed or configured at least partially or even completely, particularly in each case, as mentioned above for the method.

The system according to the invention comprises or has a, particularly the, device as mentioned above and the processing device. In particular, the processing device can be formed or configured at least partially or even completely as mentioned above for the method.

Additionally or alternatively, a, particularly according to the invention and/or the, system can comprise or have the external device. In particular, the processing device can be formed or configured at least partially or even completely as mentioned above for the method.

Other advantages and aspects of the invention result from the claims and from the description of exemplary embodiments of the invention, which are depicted in the figures as follows.

DETAILED DESCRIPTION OF THE DRAWINGS

Figure 1:
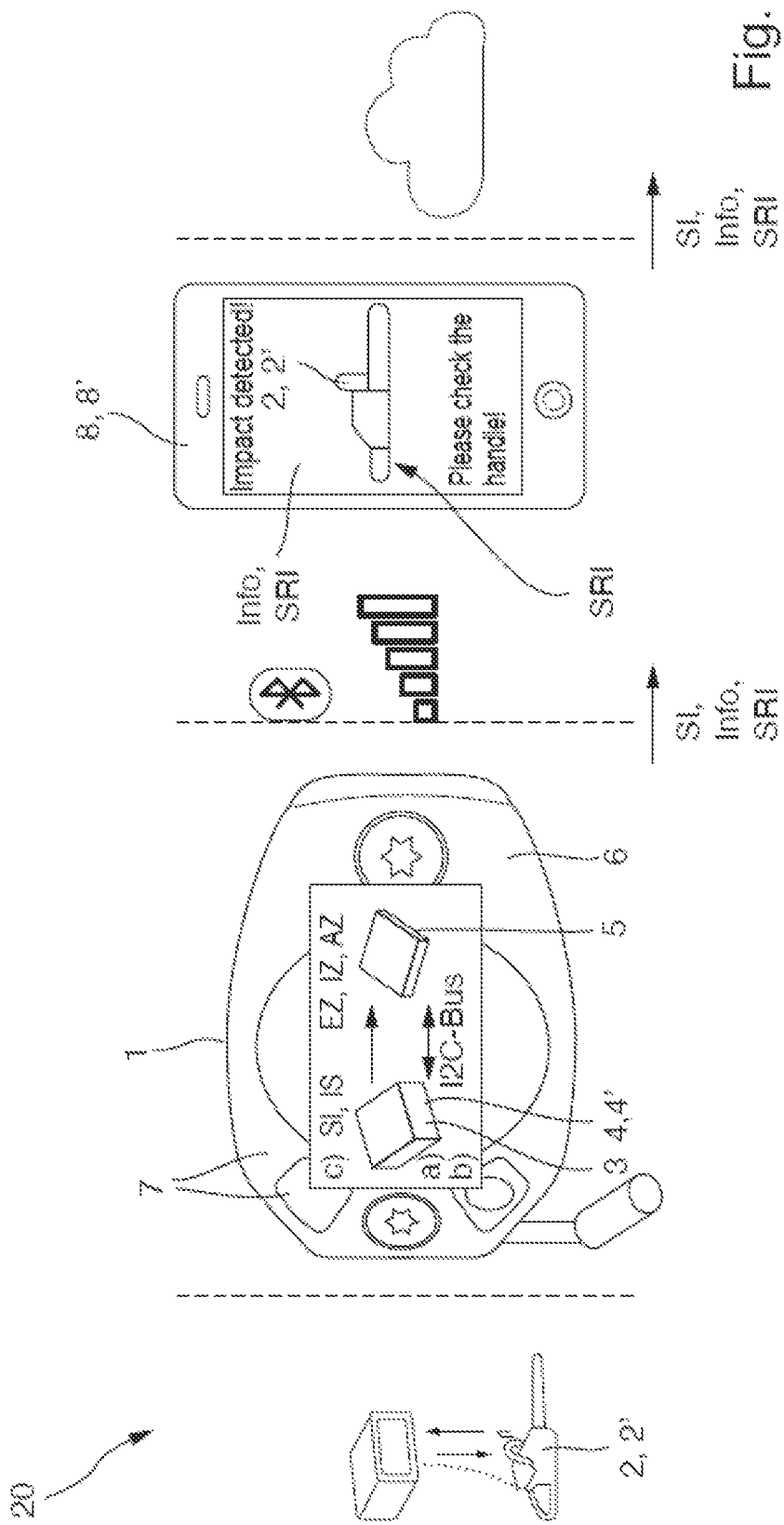
FIG. 1 is a schematic view of a system according to an embodiment of the invention comprising a device according to an embodiment of the invention and a mobile motor-driven processing device, and a method according to an embodiment of the invention for operation of the device.
Figure 4:
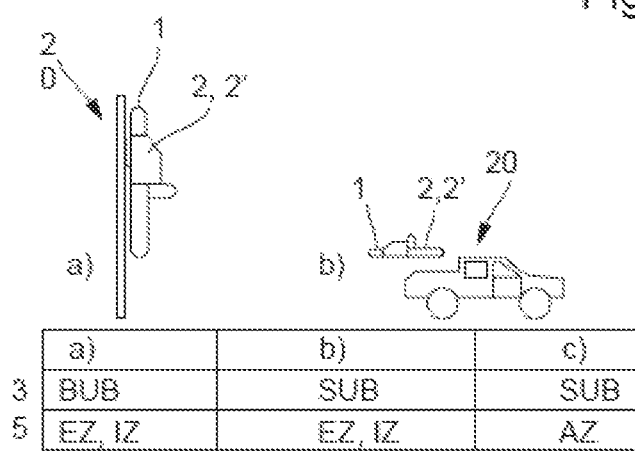
FIG. 4 is another flow chart of the method of FIG. 1.
Figure 6:
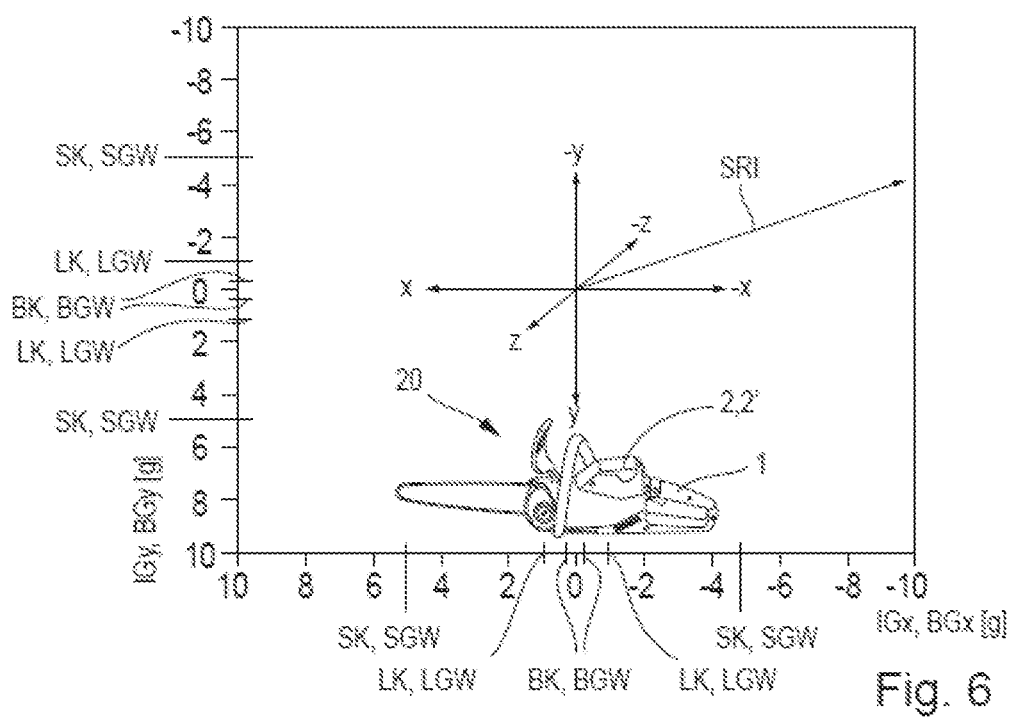
FIG. 6 is a diagram illustrating detection of at least one inertial variable in a plurality of directions by means of the inertial sensor device of the device of FIG. 1 for determination of shock and/or impact direction information by means of the method of FIG. 1.

FIGS. 1, 4, and 6 show a system 20. The system 20 has a device 1 and a mobile motor-driven processing device 2.

Figure 2:
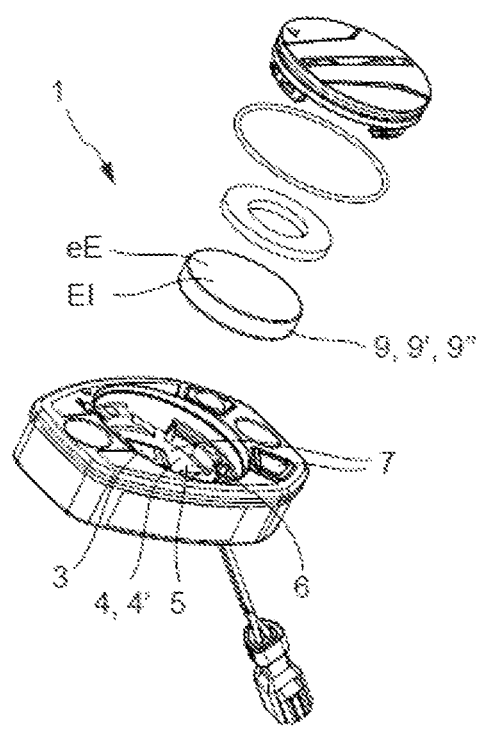
FIG. 2 is a schematic exploded view of the device of FIG. 1.
Figure 3:
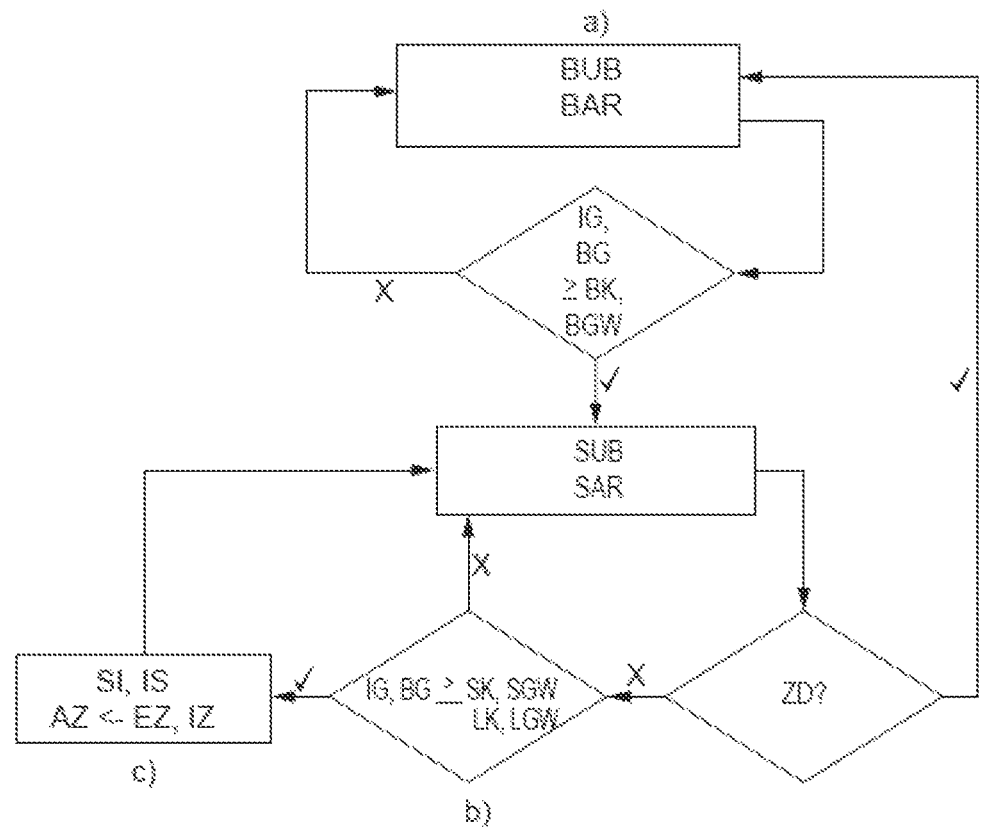
FIG. 3 is a flow chart of the method of FIG. 1.
Figure 5:
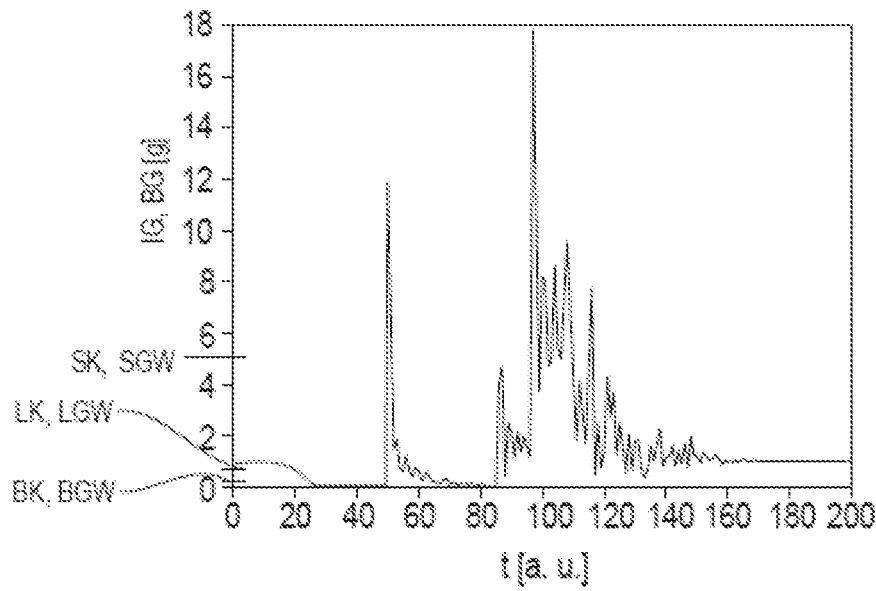
FIG. 5 is a progression of an inertial variable for detection by means of an inertial sensor device of FIG. 1 over time.

The device 1 is formed, particularly arranged, for arrangement on or in the processing device 2. The device has an inertial sensor device 3 and a control device 5, as shown in FIGS. 1 and 2. The inertial sensor device 3 has at least one inertial sensor 4. The inertial sensor 4 is formed, particularly detected, to detect an inertial variable IG, as shown in FIGS. 5 and 6. The device 1 is formed for: operation of the inertial sensor device 3 in a motion-monitoring operating mode BUB for monitoring, particularly operated and monitored, particularly respectively whether the inertial variable IG or a variable based on the inertial variable, fulfills a motion criterion BK, as shown in FIG. 3. The motion criterion BK is characteristic of a motion of the processing device 2, as shown in FIG. 4. If the motion criterion BK is fulfilled for operation of the inertial sensor device 3 in a shock and/or impact-monitoring operating mode SUB for monitoring, particularly operated and monitored, particularly respectively, whether the inertial variable IG or a variable based on the inertial variable fulfills a shock and/or impact criterion SK. The shock and/or impact criterion SK is characteristic of an atypical motion of the processing device 2. If the shock and/or impact criterion SK is fulfilled for transmission of an information signal SI by means of the inertial sensor device 3 and operation of the control device 5 as a function of the transmitted information signal SI, particularly transmitted and operated, particularly respectively.

FIGS. 1, 3, 4, and 6 show a method for operation of the device 1. The device 1 is arranged on or in the mobile motor-driven processing device 2. The device 1 has the inertial sensor device 3 and the control device 5. The inertial sensor device 3 has at least the inertial sensor 4. The inertial sensor 4 is formed to detect the inertial variable IG. The method has the following steps: a) operation of the inertial sensor device 3 in a motion-monitoring operating mode BUB for monitoring whether the inertial variable IG or the variable based on the inertial variable fulfills the motion criterion BK. The motion criterion BK is characteristic of a, particularly the, motion of the processing device 2. b) If the motion criterion BK is fulfilled, operation of the inertial sensor device 3 in the shock and/or impact-monitoring operating mode SUB for monitoring whether the inertial variable IG or the variable based on the inertial variable fulfills the shock and/or impact criterion SK. The shock and/or impact criterion is characteristic of a, particularly the, atypical motion of the processing device 2. c) If the shock and/or impact criterion SK is fulfilled, transmission of the shock and/or impact signal SI by means of the inertial sensor device 3 and operation of the control device 5 as a function of the transmitted information signal SI.

In the exemplary embodiment shown, the inertial sensor 4 is an acceleration sensor 4', as shown in FIGS. 1 and 2. The inertial variable IG is an acceleration BG, as shown in FIGS. 5 and 6. In alternative exemplary embodiments, the inertial sensor can additionally or alternatively be a rotation rate sensor and/or the inertial variable can additionally or alternatively be a rate of rotation.

Furthermore, the motion criterion BK is that the inertial variable IG or the variable is equal to or greater than a motion limit value BGW, as shown in FIGS. 3 and 5. The shock and/or impact criterion SK is that the inertial variable IG or the variable is equal to or greater than a shock and/or impact limit value SGW.

In detail, the shock and/or impact limit value SGW is greater, particularly at least two times, at least ten times in the exemplary embodiment shown, than the motion limit value BGW.

Additionally or alternatively, the motion limit value BGW is characteristic of a, particularly the, acceleration of a maximum of 0.5 g, which is 0.015 g in the exemplary embodiment shown.

Furthermore, additionally or alternatively, the shock and/or impact limit value SGW is characteristic of a, particularly the, acceleration of greater than 0.5 g, which is 5 g in the exemplary embodiment shown.

In addition, in the motion-monitoring operating mode BUB, the inertial variable IG Is detected with a motion sampling rate BAR, as shown in FIG. 3. In the shock and/or impact-monitoring operating mode SUB, the inertial variable IG is detected with a shock and/or impact sampling rate SAR.

In detail, the shock and/or impact sampling rate SAR is greater, particularly at least two times, at least four times in the exemplary embodiment shown, than the motion sampling rate BAR.

Additionally or alternatively, the motion sampling rate BAR is a maximum of 50 Hz, which is 25 Hz in the exemplary embodiment shown.

Additionally or alternatively, the shock and/or impact sampling rate SAR is greater than 50 Hz, which is 100 Hz in the exemplary embodiment shown.

In addition, the method has the following: if at least the shock and/or impact criterion SK, particularly a stay criterion LK, is not fulfilled, particularly by the inertial variable or a variable based on the inertial variable, and a time duration ZD has expired since fulfillment of the motion criterion BK and/or a start of the operation in the shock and/or impact-monitoring operating mode SUB, operation of the inertial sensor device 3 in the motion-monitoring operating mode BUB, as shown in FIG. 3.

In the exemplary embodiment shown, the stay criterion LK is that the inertial variable IG or the variable is equal to or greater than a stay limit value LGW, as shown in FIGS. 3 and 5. In detail, the stay limit value LGW is greater, particularly at least two times greater, than the motion limit value BGW and/or less than that shock and/or impact limit value SGW. Additionally or alternatively, the stay limit value LGW is characteristic of a, particularly the, acceleration of 0.04 g.

Furthermore, the time duration ZD is 10 s.

In addition, step c) has the following: transmission of the information signal SI, in the form of an interrupt signal IS in the exemplary embodiment shown, from the inertial sensor device 3 to the control device 5, as shown in FIGS. 1 and 2.

Furthermore, the device 1 has a storage device 6 and/or an output and/or transmission device 7, as shown in FIGS. 1 and 2. Step c) has the following: transmission of the information signal SI or information Info, particularly based on the information signal SI and/or the inertial variable IG or the variable and/or created by means of the control device 5, by means of the control device 5 to the storage device 6 for storage and/or to the output and/or transmission device 7 for output and/or, particularly wireless, transmission to an external device 8 of the information signal SI or of information Info based on the information signal.

In the exemplary embodiment shown, the output is optical, particularly by means of displaying a signal color and/or red.

In addition, the device 8 outputs the, particularly transmitted, information signal SI or the, particularly transmitted, information Info and/or transmits, particularly wirelessly, this, particularly further, particularly to a, particularly electronic, database, for example a cloud.

Furthermore, the system 20 has the device 8, in the form of a smartphone 8' and/or the database in the exemplary embodiment shown.

In addition, the control device 5 is, at least a large part of the time, particularly all the time in the exemplary embodiment shown, in an energy-saving state EZ, particularly an inactive state IZ, during step a) and/or step b), as shown in FIGS. 3 and 4. Step c) has the following: transition of the control device 5 from the energy-saving state EZ to an active state AZ as a function of the transmitted information signal SI, in the form of the interrupt signal IS in the exemplary embodiment shown.

In the exemplary embodiment shown, the control device 5 changes or is switched from the active state AZ to the energy-saving state EZ, particularly itself, after step c).

Furthermore, the inertial sensor device 3 changes itself from operation in the motion-monitoring operating mode BUB to operation in the shock and/or impact-monitoring operating mode SUB and/or from operation in the shock and/or impact-monitoring operating mode SUB to operation in the motion-monitoring operation mode BUB. This means that the control device 5 can be, particularly is, in the energy-saving state EZ all the time during step a) and/or step b). In alternative exemplary embodiments, the control device can transition or reconfigure or re-parameterize the inertial sensor device from operation in the motion-monitoring operating mode to operation in the shock and/or impact-monitoring operating mode and/or from operation in the shock and/or impact-monitoring operating mode to operation in the motion-monitoring operating mode, particularly by means of the I2C bus (Inter Integrated Circuit Bus) shown in FIG. 1. In particular, the control device can, particularly for this purpose, be in the active state, particularly and otherwise in the energy-saving state, at a beginning and/or an end of step a) and/or of step b).

In addition, the device 1 has an electrical energy storage device 9, as shown in FIG. 2. Electrical energy eE for operating the inertial sensor device 3 and the control device 5 is drawn from the energy storage device 9.

In detail, the energy storage device 9 has a maximum energy content EI of a maximum of 20 Wh, which is 2 Wh in the exemplary embodiment shown.

Additionally or alternatively, the energy storage device 9 is a cell 9', a button cell 9'' in the exemplary embodiment shown.

Furthermore, the at least one inertial sensor 4 is formed, particularly detected, for detecting at least one inertial variable IGx, IGy, IGz in a plurality of, three and/or mutually orthogonal directions x, y, z in the exemplary embodiment shown, as shown in FIG. 6. The method has the following: determination of shock and/or impact direction information SRI based on the at least one inertial variable IGx, IGy, IGz in the directions x, y, z, particularly by means of the control device 5 and/or the device 8 and/or, particularly elsewhere, externally.

In the exemplary embodiment shown, the shock direction information SRI has a position and/or a component of the processing device 2, as shown in FIGS. 1 and 6.

In addition, the information Info has the shock and/or impact direction information SRI, particularly is the shock and/or impact direction information SRI.

Furthermore, the motion-monitoring operating mode BUB monitors whether the at least one inertial variable IGx, IGy, IGz or the variable based on the at least one inertial variable fulfills the motion criterion BK in at least one of the directions x, y, z.

In addition, the shock and/or impact-monitoring operating mode SUB monitors whether the at least one inertial variable IGx, IGy, IGz or the variable based on the at least one inertial variable fulfills the shock and/or impact criterion SK in at least one of the directions x, y, z.

The shock and/or impact-monitoring operating mode SUB also monitors whether the at least one inertial variable IGx, IGy, IGz or the variable based on the at least one inertial variable fulfills the stay criterion LK in at least one of the directions x, y, z.

In addition, the shock and/or impact direction information SRI is by means of forming a variables vector based on the at least one inertial variable IGx, IGy, IGz in the directions x, y, z, comparison of the, particularly formed, variables vector to normal vectors, particularly by forming a, particularly respective, scalar product, and determines, based on a best result of the comparison, particularly a maximum, particularly positive, scalar product.

The processing device 2 is also a saw 2'. In alternative exemplary embodiments, the processing device can be a pruner, or a hedge trimmer, or a hedge cutter, or a wood cutter, or pruning shears, or a blower, or a leaf blower, or a suction device, or a leaf vacuum, or a cleaning device, or a high-pressure cleaner, or a roller brush, or a sweeping brush, or a lawn mower, particularly a robotic lawn mower, or a brush cutter, or a scarifier.

Moreover, the inertial sensor device 3, particularly at least the inertial sensor 4, and the control device 5, particularly and the storage device 6 and/or the output and/or transmission device 7 and/or the energy storage device 9 are, particularly electrically connected, particularly galvanically connected.

As shown on the left in FIG. 4, the processing device 2 and thus the device 3 are initially immobile or at rest, particularly stored. The motion criterion BK is therefore not fulfilled. Thus, step a) is carried out particularly further, particularly the inertial sensor device 3 is operated, particularly further, in the motion-monitoring operating mode BUB.

After that, the processing device 2 and thus the device 3 are moved, particularly raised, particularly from a storage location or a storage position to a vehicle. Thus, there is a, particularly the, motion of the processing device 2. Thus, the motion criterion BK is fulfilled. Thus, step b) is carried out, particularly the inertial sensor device 3 is operated in the shock and/or impact-monitoring operating mode SUB, as shown in the middle of FIG. 4.

After that, the processing device 2 and thus the device 3 are thrown and strike, particularly impact, particularly a loading area of the vehicle. Thus, there is a, particularly the, atypical motion of the processing device 2. Thus, the shock and/or impact criterion SK is fulfilled. Thus, step c) is carried out, particularly the information signal SI is transmitted by means of the inertial sensor device 3 and the control device 5 is operated as a function of the transmitted information signal SI, as shown on the right in FIG. 4.

This enables the atypical motion to be perceived, particularly by an owner, particularly a fleet manager, and/or a next user of the processing device.

In particular, the fleet manager can see when a particular processing device is experiencing high acceleration, which may be indicative of abuse by a handler of the device, and/or, particularly when who does what, particularly where, how, and/or why. If necessary, also on the loading area of the vehicle while being driven and/or under external influence or effect. In this way, the owner, particularly the fleet manager, can provide training and/or warn, particularly in a targeted manner.

Additionally or alternatively, the service or a technician can see whether the processing device has experienced a high acceleration, for example because of the throwing and hitting of the processing device, particularly on the loading area of the vehicle or a long running time. Additionally or alternatively, the service or the technician can see where to investigate. In this case, the direction of impact or the shock and/or impact direction information could give an indication.

In alternative exemplary embodiments, the device can additionally have a theft detection device, particularly having a position determination device, for detecting theft of the processing device. In particular if the motion criterion can be fulfilled, particularly is, the theft detection device can be operated, particularly and not otherwise.

As the exemplary embodiments shown and explained above make clear, the invention provides an advantageous method for operation of a device, wherein the device is arranged on or in a mobile motor-driven processing device, an advantageous device, wherein the device is formed, particularly arranged, on or in a mobile motor-driven processing device, and an advantageous system having such a device and the processing device, wherein the method and the device and thus the system each have improved properties.

What is claimed is:

1. A method for operating a device, wherein the device is arranged on or in a mobile motor-driven processing device, wherein the device has:
    an inertial sensor device with at least one inertial sensor formed to detect an inertial variable, and
    a control device,
    the method comprising the steps of:
    a) operating the inertial sensor device in a motion-monitoring operating mode to monitor whether the inertial variable or a variable based on the inertial variable fulfills a motion criterion, wherein the motion criterion is characteristic of a motion of the processing device;
    b) if the motion criterion is fulfilled, operating the inertial sensor device in a shock and/or impact-monitoring operating mode to monitor whether the inertial variable or a variable based on the inertial variable fulfills a shock and/or impact criterion, wherein the shock and/or impact criterion is characteristic of an atypical motion of the processing device; and
    c) if the shock and/or impact criterion is fulfilled, transmitting an information signal in the form of an interrupt signal from the inertial sensor device to the control device, and operating the control device as a function of the transmitted information signal, wherein:
    the motion criterion is different from the shock and/or impact criterion,
    at a point in time, the inertial sensor device is only capable of monitoring one of whether the motion criterion is fulfilled or whether the shock and/or impact criterion is fulfilled, and is not capable of monitoring both whether the motion criterion is fulfilled and whether the shock and/or impact criterion is fulfilled,
    the processing device is a garden, forest, construction, and/or soil cultivation device,
    the control device is in an energy-saving state for at least a large part of the time, during step a) and/or step b), and
    step c) further comprises: transitioning the control device from the energy-saving state to an active state as a function of the transmitted information signal.

2. The method according to claim 1,
    wherein the inertial sensor is an acceleration and/or rotation rate sensor, and
    wherein the inertial variable is an acceleration and/or a rate of rotation.

3. The method according to claim 1,
    wherein the motion criterion is that the inertial variable or the variable based on the inertial variable is equal to or greater than a motion limit value,
    wherein the shock and/or impact criterion is that the inertial variable or the variable based on the inertial variable is equal to or greater than a shock and/or impact limit value, and
    wherein the shock and/or impact criterion is greater than the motion limit value.

4. The method according to claim 1,
    wherein the motion criterion is that the inertial variable or the variable is equal to or greater than a motion limit value, wherein the motion limit value is characteristic of an acceleration of a maximum of 0.5 g, and/or
    wherein the shock and/or impact criterion is that the inertial variable or the variable based on the inertial variable is equal to or greater than a shock and/or impact limit value, wherein the shock and/or impact limit value is characteristic of an acceleration of greater than 0.5 g.

5. The method according to claim 1,
    wherein, in the motion-monitoring operating mode, the inertial variable is detected with a motion sampling rate,
    wherein, in the shock and/or impact-monitoring operating mode, the inertial variable is detected with a shock and/or impact sampling rate, and
    wherein the shock and/or impact sampling rate is greater than the motion sampling rate.

6. The method according to claim 1,
    wherein, in the motion-monitoring operating mode, the inertial variable is detected with a motion sampling rate, wherein the motion sampling rate is a maximum of 50 Hz, and/or
    wherein, in the shock and/or impact-monitoring operating mode, the inertial variable is detected with a shock and/or impact sampling rate, wherein the shock and/or impact sampling rate is greater than 50 Hz.

7. The method according to claim 1, further comprising:
    if at least the shock and/or impact criterion is not fulfilled and a time duration has expired since fulfillment of the motion criterion and/or a start of the operation in the shock and/or impact-monitoring operating mode, operating the inertial sensor device in the motion-monitoring operating mode.

8. The method according to claim 1,
    wherein the device has a storage device and/or an output and/or a transmission device, and
    wherein step c) further comprises: transmitting the information signal, based on the information signal and/or the inertial variable or variable based on the inertial variable and/or created by way of the control device, via the control device to the storage device for storage and/or to the output and/or transmission device for output and/or, wirelessly, transmitting to an external device the information signal or information based on the information signal.

9. The method according to claim 1,
    wherein the device has an electrical energy storage device,
    wherein electrical energy for operation of the inertial sensor device and the control device is drawn from the electrical energy storage device.

10. The method according to claim 9,
    wherein the electrical energy storage device has a maximum energy content of a maximum of 20 Wh.

11. The method according to claim 9,
    wherein the electrical energy storage device has a maximum energy content of a maximum of 20 Wh, and/or
    wherein the electrical energy storage device is a cell.

12. The method according to claim 1,
    wherein the at least one inertial sensor is formed to detect at least one inertial variable in a plurality of mutually orthogonal directions, and wherein the method further comprises:
determining shock and/or impact direction information based on the at least one inertial variable in the directions.

13. The method according to claim 1,
wherein the motion criterion is that the inertial variable or the variable is equal to or greater than a motion limit value, wherein the motion limit value is characteristic of an acceleration of a maximum of 0.5 g.

14. The method according to claim 1,
wherein the device has a storage device, an output, and a transmission device, and
wherein step c) further comprises: transmitting the information signal, based on the information signal and the inertial variable or variable based on the inertial variable and created by way of the control device, via the control device to the storage device for storage and to the output and the transmission device for output and, wirelessly, transmitting to an external device the information signal or information based on the information signal.

15. The method according to claim 1, wherein the motion-monitoring mode and the shock and/or impact-monitoring operating mode are different.

16. A device for arrangement on or in a mobile motor-driven processing device, comprising:
an inertial sensor device, wherein the inertial sensor device has at least one inertial sensor, wherein the inertial sensor is formed to detect an inertial variable; and
a control device,
wherein the control device is configured to execute:
a) operation of the inertial sensor device in a motion-monitoring operating mode to monitor whether the inertial variable or a variable based on the inertial variable fulfills a motion criterion, wherein the motion criterion is characteristic of a motion of the processing device,
b) if the motion criterion is fulfilled, operation of the inertial sensor device in a shock and/or impact-monitoring operating mode to monitor whether the inertial variable or a variable based on the inertial variable fulfills a shock and/or impact criterion, wherein the shock and/or impact criterion is characteristic of an atypical motion of the processing device, and
c) if the shock and/or impact criterion is fulfilled, transmission of an information signal in the form of an interrupt signal from the inertial sensor device to the control device, and operation of the control device as a function of the transmitted information signal, wherein:
the motion criterion is different from the shock and/or impact criterion,
at a point in time, the inertial sensor device is only capable of monitoring one of whether the motion criterion is fulfilled or whether the shock and/or impact criterion is fulfilled, and is not capable of monitoring both whether the motion criterion is fulfilled and whether the shock and/or impact criterion is fulfilled,
the processing device is a garden, forest, construction, and/or soil cultivation device,
the control device is in an energy-saving state for at least a large part of the time, during a) and/or b), and
c) further comprises: transition of the control device from the energy-saving state to an active state as a function of the transmitted information signal.

17. A system comprising:
a device according to claim 16; and
the mobile motor-driven processing device.

18. The device according to claim 16, wherein the motion-monitoring mode and the shock and/or impact-monitoring operating mode are different.

* * * * *